US012630161B2

(12) United States Patent
Ishiwada

(10) Patent No.: US 12,630,161 B2
(45) Date of Patent: May 19, 2026

(54) IN-VEHICLE CONTROL DEVICE

(71) Applicant: TOYOTA JIDOSHA KABUSHIKI KAISHA, Toyota (JP)

(72) Inventor: Takeshi Ishiwada, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/660,731

(22) Filed: May 10, 2024

(65) Prior Publication Data

US 2025/0074418 A1 Mar. 6, 2025

(30) Foreign Application Priority Data

Aug. 28, 2023 (JP) ................................. 2023-138252

(51) Int. Cl.
| | |
|---|---|
| *B60W 30/18* | (2012.01) |
| *B60W 10/08* | (2006.01) |
| *B60W 10/10* | (2012.01) |
| *B60W 10/18* | (2012.01) |
| *B60W 10/196* | (2012.01) |
| *B60W 50/10* | (2012.01) |

(52) U.S. Cl.
CPC ...... *B60W 30/18027* (2013.01); *B60W 10/08* (2013.01); *B60W 10/10* (2013.01); *B60W 10/182* (2013.01); *B60W 10/196* (2013.01); *B60W 50/10* (2013.01); *B60W 2510/186* (2013.01); *B60W 2520/16* (2013.01); *B60W*

*2520/28* (2013.01); *B60W 2540/12* (2013.01); *B60W 2710/083* (2013.01); *B60W 2710/188* (2013.01)

(58) Field of Classification Search
None
See application file for complete search history.

(56) References Cited

U.S. PATENT DOCUMENTS

2020/0292075 A1* 9/2020 Cho ...................... B60W 10/08

FOREIGN PATENT DOCUMENTS

| | | |
|---|---|---|
| JP | 2009-113743 A | 5/2009 |
| JP | 2009-254162 A | 10/2009 |
| JP | 2019-093911 A | 6/2019 |
| JP | 2020-043700 A | 3/2020 |

* cited by examiner

*Primary Examiner* — Lail A Kleinman
(74) *Attorney, Agent, or Firm* — SoraIP, Inc.

(57) ABSTRACT

The in-vehicle control device is mounted on a motor vehicle including a shift mechanism having a parking position for performing a shift lock on an axle, an electric parking brake for applying a braking force to a wheel connected to the axle, and an electric motor capable of inputting and outputting power to and from the axle. The vehicle control device performs shock reduction control for suppressing a shock generated in the vehicle by outputting torque corresponding to the inclination angle of the vehicle from the electric motor when releasing the shift lock, and determines whether to perform the shock reduction control when releasing the shift lock according to a state when activating the shift lock and a state after activating the shift lock.

1 Claim, 3 Drawing Sheets

IN-VEHICLE CONTROL DEVICE

CROSS-REFERENCE TO RELATED APPLICATION

This application claims priority to Japanese Patent Application No. 2023-138252 filed on Aug. 28, 2023, incorporated herein by reference in its entirety.

BACKGROUND

1. Technical Field

The present disclosure relates to in-vehicle control devices, and more particularly to an in-vehicle control device mounted on a vehicle with an electric parking brake.

2. Description of Related Art

An in-vehicle control device that has been conventionally proposed as this type of in-vehicle control device performs a process of activating a brake device and a process of releasing a parking mechanism when an idling request is made, a shift lever is in a parking position, and the brake device is not activated (see, for example, Japanese Unexamined Patent Application Publication No. 2019-093911 (JP 2019-093911 A)). This device releases the torsional torque of a drive shaft and releases the torque transmitted to an engine by these processes, thereby reducing vibration of the vehicle.

SUMMARY

In an in-vehicle control device mounted on a vehicle with a motor configured to output torque to a drive shaft, a shock occurs if the torsional torque of the drive shaft is released all at once. Therefore, when releasing the lock, damping torque (assist torque) for reducing the shock is also output from the motor. In this case, when the damping torque is output from the motor, a shock may occur due to the damping torque depending on the case.

It is a primary object of an in-vehicle control device of the present disclosure to reduce a shock that may occur when releasing shift lock.

The in-vehicle control device of the present disclosure adopts the following means in order to achieve the above primary object.

The in-vehicle control device of the present disclosure is an in-vehicle control device mounted on a motor vehicle and configured to perform shock reduction control, the motor vehicle including a shift mechanism including a parking position for activating shift lock on an axle, an electric parking brake configured to apply a braking force to a wheel connected to the axle, and an electric motor configured to input and output power to and from the axle, and the shock reduction control being control for reducing a shock that occurs in the vehicle by outputting torque according to a tilt angle of the vehicle from the electric motor when releasing the shift lock. The in-vehicle control device determines whether to perform the shock reduction control when releasing the shift lock according to either or both of a state when activating the shift lock and a state after activating the shift lock.

The in-vehicle control device of the present disclosure is mounted on the motor vehicle including the shift mechanism including the parking position for activating shift lock on the axle, the electric parking brake configured to apply a braking force to the wheel connected to the axle, and the electric motor configured to input and output power to and from the axle. The in-vehicle control device of the present disclosure basically performs the shock reduction control for reducing a shock that occurs in the vehicle by outputting torque according to the tilt angle of the vehicle from the electric motor when releasing the shift lock. The in-vehicle control device of the present disclosure determines whether to perform the shock reduction control when releasing the shift lock according to either or both of the state when activating the shift lock and the state after activating the shift lock. Accordingly, it is possible to reduce a shock caused by performing the shock reduction control and to reduce a shock that may occur when releasing the shift lock.

In the in-vehicle control device of the present disclosure, the shock reduction control may not be performed regardless of tilt of the vehicle when the shift lock is activated with a foot brake applied and the shift lock is released with the foot brake released after activation of the electric parking brake is completed. When the shift lock is activated with the foot brake applied and the foot brake is released after activation of the electric parking brake is completed, the axle is not subjected to torsion, and therefore no torsional torque is applied to the axle. Accordingly, it is not necessary to perform the shock reduction control for reducing a shock caused by the torsional torque of the axle. As a result, it is possible to reduce a shock caused by performing the shock reduction control.

In the in-vehicle control device of the present disclosure, the shock reduction control may not be performed regardless of tilt of the vehicle when the shift lock is activated with a foot brake applied and the shift lock is released with no history of rotation of the wheel after activation of the shift lock. When there is no history of rotation of the wheel after activation of the shift lock, the axle is not subjected to torsion. Therefore, no torsional torque is applied to the axle. As a result, it is possible to reduce a shock caused by performing the shock reduction control.

In the in-vehicle control device of the present disclosure, the shock reduction control may not be performed regardless of tilt of the vehicle when the shift lock is activated with a foot brake applied and the shift lock is released with no history of releasing the foot brake after activation of the shift lock. When the shift lock is activated with the foot brake applied and the shift lock is released with no history of releasing the foot brake after activation of the shift lock, it means that the shift lock is activated with the foot brake applied and the shift lock is then released with the foot brake continuously applied. In this case as well, the axle is not subjected to torsion, and therefore it is not necessary to perform the shock reduction control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
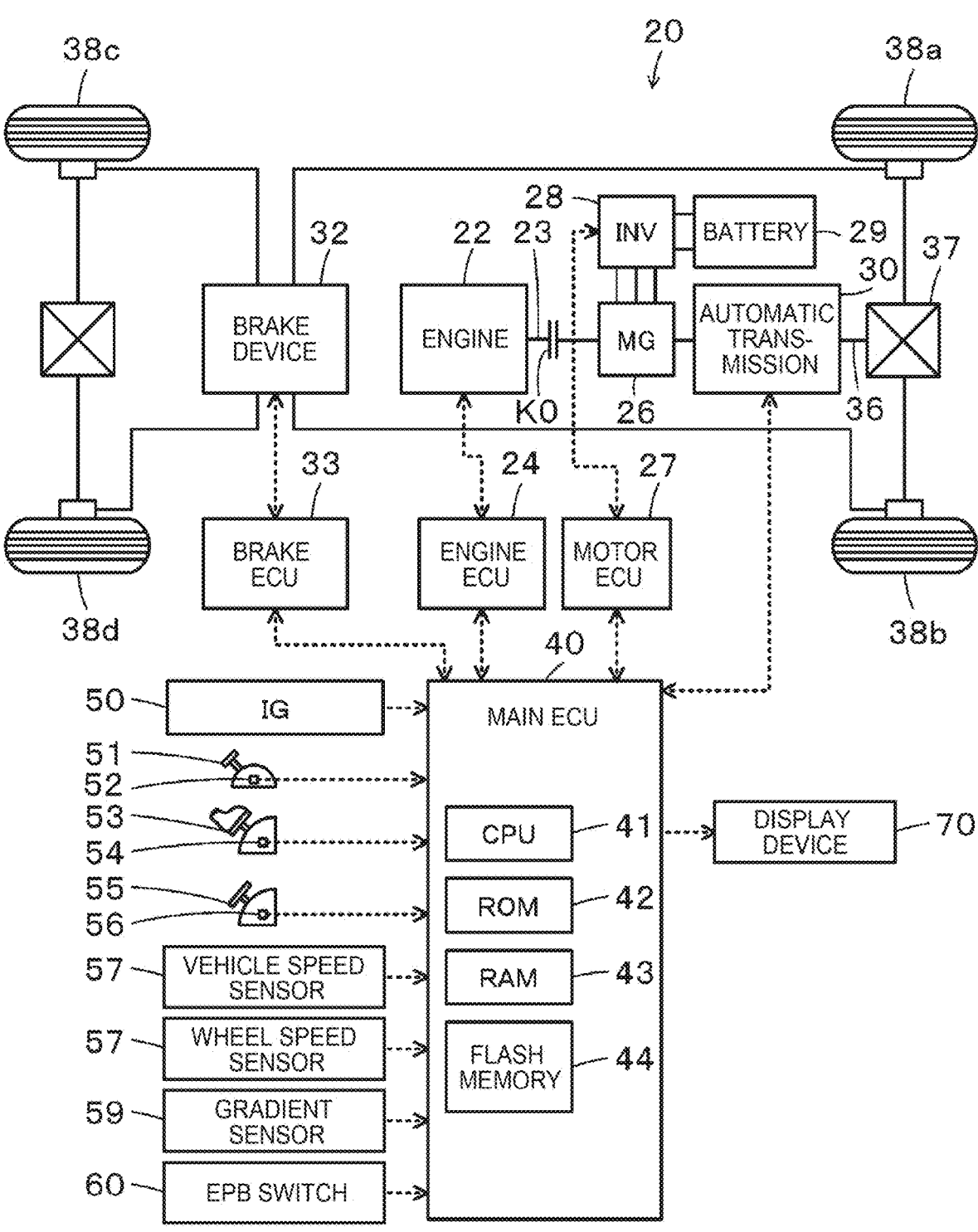
FIG. 1 is a configuration diagram schematically illustrating a configuration of a hybrid electric vehicle 20 according to an embodiment of the present disclosure.

Next, an embodiment for carrying out the present disclosure will be described. FIG. 1 is a configuration diagram schematically illustrating a configuration of a hybrid electric vehicle 20 according to an embodiment of the present disclosure. Hybrid electric vehicle 20 of the embodiment includes, as shown, an engine 22, a motor 26, a battery 29, an automatic transmission 30, a brake device 32, and an electronic control unit (hereinafter referred to as "main ECU") 40.

The engine 22 is configured as an internal combustion engine that outputs power using fuel such as gasoline or light oil from a fuel tank. The crankshaft 23 of the engine 22 is connected to a rotary shaft (rotor) of the motor 26 via a clutch K0. The operation of the engine 22 is controlled by an engine electronic control unit (hereinafter referred to as the "engine ECU") 24.

Although not shown, the engine ECU 24 includes a microcomputer having a central processing unit (CPU), a read-only memory (ROM), a random access memory (RAM), a flash memory, an input/output port, and a communication port. The engine ECU 24 receives a signal from various sensors required for controlling the operation of the engine 22, for example, a crank angle θcr from a crank position sensor (not shown), a signal from a coolant temperature Tw from a water temperature sensor (not shown), etc., which detect the temperature of the coolant of the engine 22, which detects the rotational position of the crankshaft 23 of the engine 22, via an input port. Various control signals for controlling the operation of the engine 22 are output from the engine ECU 24 via an output port. The engine ECU 24 is connected to the main ECU 40 via a communication port. The engine ECU 24 calculates the rotational speed Ne of the engine 22 based on the crank angle θcr of the crankshaft 23 from the crank position sensor.

The motor 26 is configured as, for example, a synchronous generation electric motor, and includes a rotor in which a permanent magnet is embedded in a rotor core, and a stator in which a three-phase coil is wound around the stator core. A rotary shaft to which the rotor of the motor 26 is fixed is connected to the crankshaft 23 of the engine 22 via a clutch KD and is connected to an input shaft of the automatic transmission 30. The motor 26 is rotationally driven by a motor electronic control unit (hereinafter, referred to as a "motor ECU") 27 that controls switching of a plurality of switching elements of the inverter 28 so that DC power from the battery 29 is converted into three-phase AC power and applied to a three-phase coil of the motor 26.

Although not shown, the motor ECU 27 includes a microcomputer having a CPU, a ROM, RAM, a flash memory, an input/output port, and a communication port. In the motor ECU 27, signals from various sensors, for example, a rotational position of a rotor (rotating shaft 31) of the motor 26 is detected, a rotational position Om from a rotational position sensor (not shown), a phase currents Iu, Iv from a current sensor for detecting a phase current of each phase of the motor 26, and the like are inputted via an input-port. From the motor ECU 27, a control signal to the inverter 28 is output via an output port. The motor ECU 27 is connected to the main ECU 40 via a communication port. The motor ECU 27 calculates the rotational speed Nm of the motor 26 based on the rotational position Om of the rotor (rotational shaft) of the motor 26 from the rotational position sensor.

The clutch K0 is configured, for example, as a hydraulically driven frictional clutch, and is controlled by a main HVECU 40 to connect and disconnect the crankshaft 23 of the engine 22 and the rotating shaft of the motor 26.

The automatic transmission 30 includes a torque converter and a stepped (e.g., six gears) automatic transmission. The torque converter is configured as a general fluid transmission device, and transmits the power of the input shaft connected to the rotation shaft of the motor 26 to the input shaft of the automatic transmission by amplifying the torque, or transmits the torque without amplifying the torque. The automatic transmission forms a forward stage, a reverse stage, and a shift lock from first gear to Nth gear by disengagement of a plurality of friction engagement elements, and transmits power between the input shaft and the axle 36 as an output shaft. The hydraulic pressure of the hydraulic oil from the mechanical oil pump or the electric oil pump is regulated and supplied to the clutch K0 or the automatic transmission by a hydraulic control device (not shown). The hydraulic control device includes a valve body provided with a plurality of oil passages, a plurality of regulator valves, a plurality of linear solenoid valves, and the like. The hydraulic control device is controlled by a main ECU 40. The main ECU 40 changes the gear position of the automatic transmission by applying the accelerator operation amount Acc and the vehicle speed V to a shift diagram (not shown).

The brake device 32 is configured as a known hydraulic drive brake device. The brake device 32 is configured to be able to apply a braking force caused by a braking force caused by depressing the brake pedal 58 and a braking force caused by adjusting the hydraulic pressure to the wheels 38*a*, 38*b* and the wheels 38*c*, 38*d*. The brake device 32 is driven and controlled by a brake electronic control unit (hereinafter referred to as a "brake ECU") 33. Although not shown, the brake ECU 33 includes a microcomputer having a CPU, a ROM, RAM, a flash memory, an input/output port, and a communication port. The brake ECU 33 controls the braking force caused by the braking force of the brake device 32 and the braking force caused by adjusting the hydraulic pressure. The brake ECU 33 communicates with the main ECU 40 via a communication port.

The main ECU 40 includes a microcomputer having a CPU 41, a ROM 42, RAM 43, a flash memory 44, an input/output port (not shown), and a communication port. Signals from various sensors are input to the main ECU 40 through an input port. Examples of the signal inputted to the main ECU 40 include an ignition signal from the ignition switch 50, a shift position SP from the shift position sensor 52 that detects the position of the shift lever 51, an accelerator operation amount Acc from the accelerator pedal position sensor 54 that detects the depression amount of the accelerator pedal 53, and a brake pedal position BP from the brake pedal position sensor 56 that detects the depression amount of the brake pedal 55. Further, the vehicle speed V from the vehicle speed sensor 51, the respective wheel speeds from the wheel speed sensor 52, and the road surface gradient Or from the gradient sensor 55 can also be exemplified. Further, an EPBSW signal from the electric parking brake switch (hereinafter, referred to as "EPB switch") 60, a signal from a sensor for detecting various conditions of the clutch K0 and the hydraulic control device of the automatic transmission 30, and the like can also be cited. The electric parking brake is configured such that the brake device 32 is driven and controlled by a brake ECU 33 to apply a braking force to the wheels 38*a*, 38*b*. The electric parking brake is activated when EPB switch 60 is turned on, and is released when EPB switch 60 is turned off or the shift lock is released.

Various control signals are output from the main ECU 40 via an output port. Examples of the control signal outputted from the main ECU 40 include a control signal to the hydraulic control device and a display control signal to the display device 70. As described above, the main ECU 40 communicates with the engine ECU 24, the motor ECU 27, the brake ECU 33, and the like via a communication port.

Figure 2:
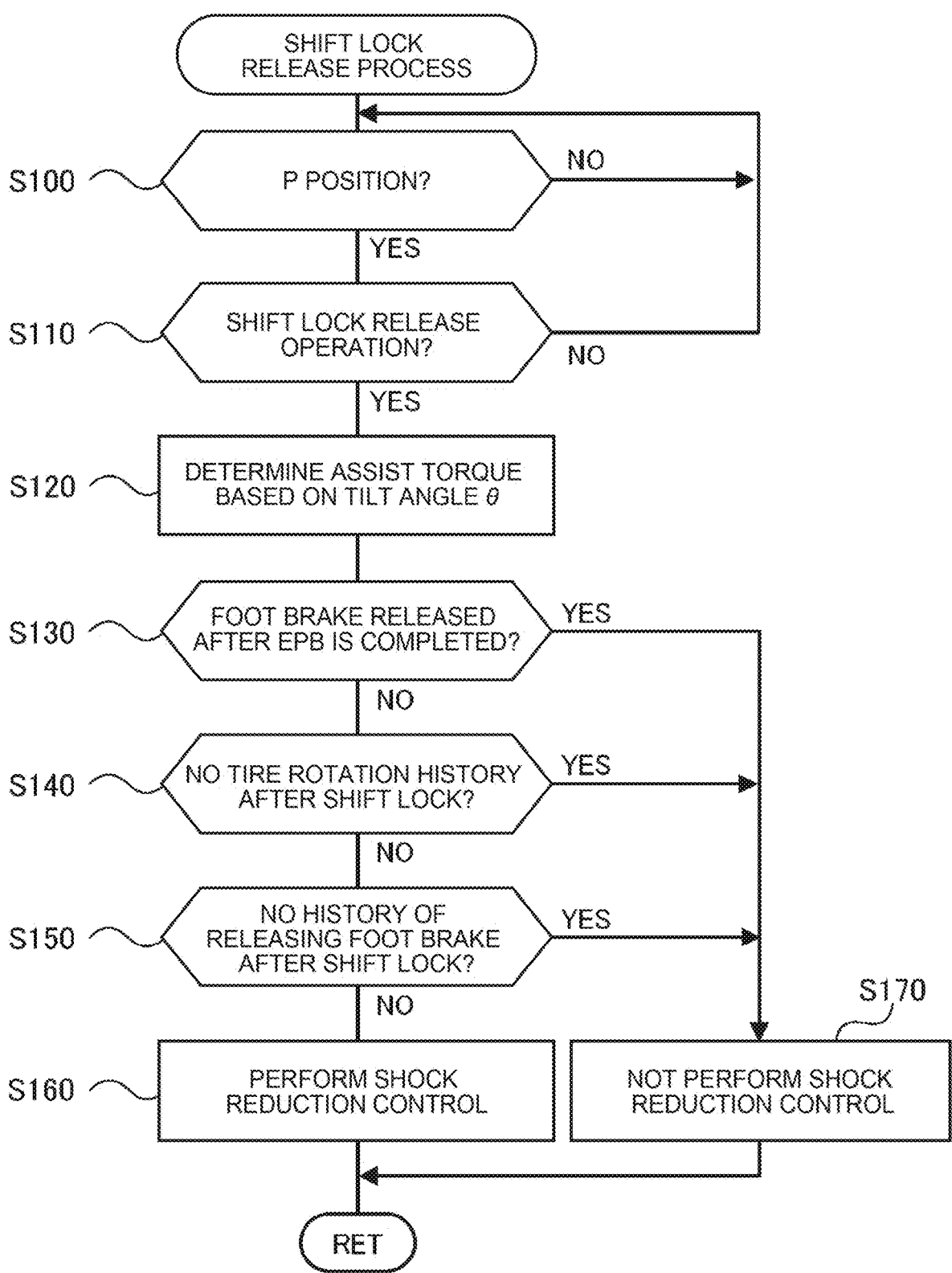
FIG. 2 is a flow chart illustrating an exemplary shift lock release process that is performed by the main ECU 40.
Figure 3:
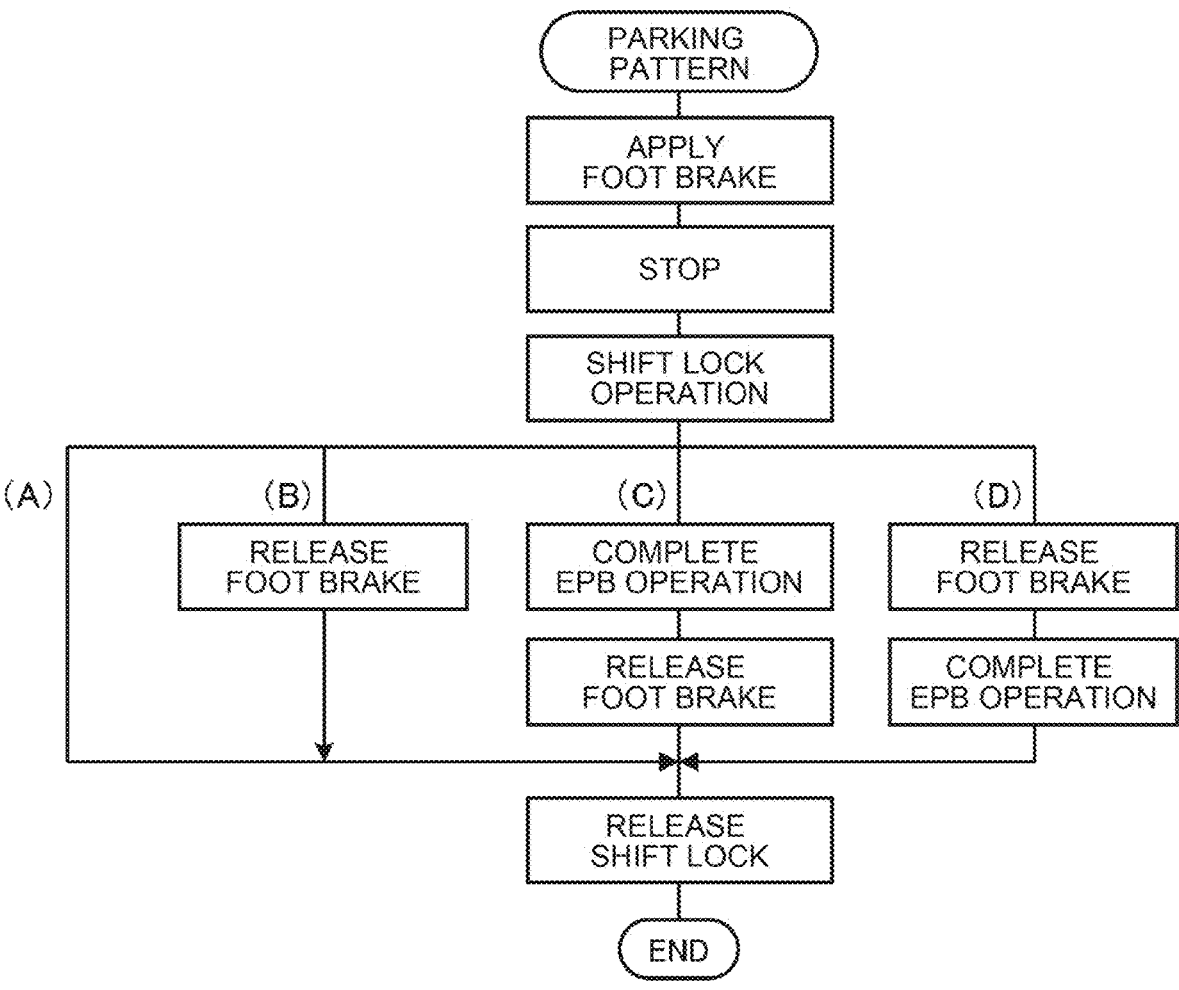
FIG. 3 is an explanatory diagram illustrating an example of a parking time pattern with a shift lock.

Next, the operation of the hybrid electric vehicle 20 of the embodiment configured as described above, in particular, the operation when releasing the shift lock, will be described. FIG. 2 is a flowchart illustrating an example of a shift lock release process that is performed by the main ECU 40, and FIG. 3 is an illustration showing an example of a parking pattern with shift lock. For ease of explanation, first, a parking pattern with shift lock will be described with reference to FIG. 3, and then, an operation when releasing shift lock will be described with reference to FIG. 2.

In the parking pattern, in any pattern, first, the driver depresses the brake pedal 55 to apply the foot brake to stop the vehicle. Then, in a state where the brake pedal 55 is depressed, the shift lever 51 is set to the P position (parking position) and the shift lock is activated. The pattern (A) is a pattern in which the shift lock is released with the shift lever 51 in the R position (reverse position), the N position (neutral position), or the D position (forward position) without applying the electric parking brake in this common state (state where the shift lock is activated and the driver depresses the brake pedal 55). The pattern B is a pattern in which the driver releases the foot brake by releasing the depression of the brake pedal 55 from the common state, and then releases the shift lock without applying the electric parking brake. The pattern (C) is a pattern in which, after the electric parking brake is activated from the common state, the driver releases the foot brake by releasing the depression of the brake pedal 55, and then releases the shift lock. The pattern (D) is a pattern in which the driver releases the brake pedal 55 from the common state, releases the foot brake, activates the electric parking brake, and then releases the shift lock.

In the shift lock release process of FIG. 2, first, it is determined whether or not the shift position SP is the P position (parking position) (S100), and it is determined whether or not the shift lock is released by changing the shift position SP from the P position to the R position, the N position, the D position, or the like (S110). When it is determined in S100 that the shift position SP is not the P position, or when it is determined in S110 that the shift lock is not released, it is determined that the shift position is not the target of this process, and the process returns to S10 process.

When the shift position SP is changed from the P position to the R position, the N position, the D position, or the like in S100 and S110 and it is determined that the shift lock has been released, an assist torque for vibration damping to reduce the shock when activating the shift lock is determined based on the inclination angle θ of the vehicle obtained by using the road surface gradient θr or the like from the gradient sensor 59 (S120). The assist torque is used as an opposite-phase torque for canceling the torsional torque of the axle 36 as the inclination angle θ of the vehicle increases. For example, the relationship between the inclination angle θ of the vehicle and the assist torque is obtained in advance by an experiment, machine learning, or the like, and stored as an assist torque setting map, and when the inclination angle θ of the vehicle is given, the corresponding assist torque is derived from the assist torque setting map, whereby the assist torque can be determined.

Next, it is determined whether the foot brake has been released after completion of activation of the electric parking brake (S130). This determination is to determine whether or not the pattern (C) in the parking time pattern of FIG. 3. When it is determined that the pattern is the pattern (C) in which the foot brake is released after activation of the electric parking brake is completed, the present process is terminated without performing the shock reduction control for outputting the assist torque from the motor 26 when releasing the shift lock (S170). This is because, in the pattern (C), since the foot brake is released after activation of the electric parking brake is completed after activation of the shift lock, no torsional torque is applied to the axle 36, and therefore, it is not necessary to perform the shock reduction control.

When it is determined in S130 that the pattern is not the pattern (C) in which the foot brake is released after activation of the electric parking brake is completed, it is determined whether there is a history of rotation of the wheels 38a, 38b after activation of the shift lock (S140). Whether there is a history of rotation of the wheels 38a, 38b can be determined by determining whether the wheel speed has occurred in the wheels 38a, 38b by the wheel speed sensor 57 after activation of the shift lock. When it is determined that there is no history of rotation of the wheels 38a, 38b after activation of the shift lock, the process ends without performing the shock reduction control (S170). The torsional torque on the axle 36 is generated by the wheels 38a, 38b rotating after the shift lock is activated. This is because, when there is no history of rotation of the wheels 38a, 38b after activation of the shift lock, no torsional torque is applied to the axle 36 and there is no need to perform the shock reduction control. This corresponds to a pattern (A) or a pattern (C) in the parking pattern of FIG. 3.

Next, it is determined whether there is a history of releasing the foot brake after activation of the shift lock (S150). When it is determined that there is no history of releasing the foot brake after activation of the shift lock, the process ends without performing the shock reduction control (S170). When there is no history of releasing the foot brake after activation of the shift lock, it means that there is no history of rotation of the wheels 38a, 38b after activation of the shift lock. Therefore, no torsional torque is applied to the axle 36. Therefore, it is not necessary to perform shock reduction control. This corresponds to the pattern (A) in the parking pattern of FIG. 3.

When a negative determination is made in S150 determination from S130, it is determined that the torsional torque is applied to the axle 36, and the shock reduction control for outputting the assist torque from the motor 26 when releasing the shift lock is performed (S160), and this process is ended.

In hybrid electric vehicle 20 of the above embodiment, when the foot brake is released after completion of activation of the electric parking brake at the time of stopping the vehicle and activating the shift lock, the shock reduction control for outputting the assist torque from the motor 26 is not performed when releasing the shift lock. Accordingly, it is possible to reduce vibration and shock caused by performing the shock reduction control even though the torsional torque is not applied to the axle 36.

In the hybrid electric vehicle 20 of the embodiment, when there is no history of rotation of the wheels 38a, 38b after the vehicle is stopped and the shift lock is activated, the shock reduction control for outputting the assist torque from the motor 26 is not performed when releasing the shift lock. Accordingly, it is possible to reduce vibration and shock caused by performing the shock reduction control even though the torsional torque is not applied to the axle 36.

Further, in the hybrid electric vehicle 20 of the embodiment, when there is no history of releasing the foot brake after the vehicle is stopped and the shift lock is activated, the shock reduction control for outputting the assist torque from the motor 26 is not performed when releasing the shift lock. Accordingly, it is possible to reduce vibration and shock caused by performing the shock reduction control even though the torsional torque is not applied to the axle 36.

In the hybrid electric vehicle 20 of the embodiment, the stepped automatic transmission 30 is provided, but the automatic transmission 30 may be a continuously variable transmission.

In hybrid electric vehicle 20 of the embodiment, the motor 26 and the automatic transmission 30 are connected to the crankshaft 23 of the engine 22 via a clutch K0. However, the crankshaft 23 of the engine 22 may be connected to the motor 26 and the automatic transmission 30 without using a clutch K0. Further, in addition to the configuration in which the motor 26 and the automatic transmission 30 are connected to the crankshaft 23 of the engine 22 via the clutch K0, the second motor may be attached to an axle connected to the wheels 38c, 38d. Instead of the motor 26, an in-wheel motor that is directly attached to the wheels 38a, 38b may be provided. That is, any configuration may be adopted as long as the motor vehicle includes the shift mechanism, the electric parking brake, and the electric motor.

The correspondence between the main elements of the embodiments and the main elements of the disclosure described in the column of the means for solving the problem will be described. In the embodiment, the shift lever 51 and the automatic transmission 30 correspond to a "shift mechanism". In the embodiment, the electric parking brake switch 60 and the brake device 32 correspond to an "electric parking brake". In the embodiment, the motor 26 corresponds to an "electric motor". The hybrid electric vehicle 20 corresponds to "motor vehicle". In the embodiment, the main electronic control unit 40, the motor electronic control unit 27, and the brake electronic control unit 33 correspond to the "in-vehicle control device".

The correspondence between the main elements of the embodiment and the main elements of the disclosure described in the section of the means for solving the problem is an example for specifically explaining the embodiment of the disclosure described in the section of the means for solving the problem. The correspondence is not intended to limit the elements of the disclosure described in the section of the means for solving the problem. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described using the embodiments, it is needless to say that the present disclosure is not limited to such embodiments, and can be carried out in various forms without departing from the gist of the present disclosure.

The present disclosure is applicable to the manufacturing industry of motor vehicles etc.

What is claimed is:

1. An in-vehicle control device configured to be mounted on a motor vehicle and configured to perform shock reduction control, the motor vehicle including a shift mechanism including a parking position for activating shift lock on an axle, an electric parking brake configured to apply a braking force to a wheel connected to the axle, and an electric motor configured to input and output power to and from the axle, and the shock reduction control being control for reducing a shock that occurs in the motor vehicle by outputting torque according to a tilt angle of the motor vehicle from the electric motor when releasing the shift lock, the in-vehicle control device comprising a processor configured to determine whether to perform the shock reduction control when releasing the shift lock according to both of a state when activating the shift lock and a state after activating the shift lock, wherein when the shift lock is activated with a foot brake applied and the shift lock is released with the foot brake released after activation of the electric parking brake is completed, the shock reduction control is not performed regardless of tilt of the motor vehicle.

* * * * *